United States Patent
Angrish et al.

(10) Patent No.: US 9,760,647 B2
(45) Date of Patent: Sep. 12, 2017

(54) TECHNIQUES FOR AUTOMATICALLY EXPOSING, AS WEB SERVICES, PROCEDURES AND FUNCTIONS STORED IN A DATABASE

(75) Inventors: Rohan Angrish, Redwood City, CA (US); James W. Warner, Mountain View, CA (US); Zhen Hua Liu, San Mateo, CA (US); Muralidhar Krishnaprasad, Fremont, CA (US); Anand Manikutty, Foster City, CA (US); Vikas Arora, San Francisco, CA (US); Susan M. Kotsovolos, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2789 days.

(21) Appl. No.: 11/008,425

(22) Filed: Dec. 8, 2004

(65) Prior Publication Data

US 2006/0136351 A1 Jun. 22, 2006

(51) Int. Cl.
*G06F 7/00* (2006.01)
*G06F 17/30* (2006.01)
*G06F 9/54* (2006.01)

(52) U.S. Cl.
CPC .......... *G06F 17/3089* (2013.01); *G06F 9/547* (2013.01)

(58) Field of Classification Search
CPC ..................................................... G06F 9/547
USPC ................. 707/104.1, 5, 3, 10, 100, 200
See application file for complete search history.

(56) References Cited

U.S. PATENT DOCUMENTS

| | | | | |
|---|---|---|---|---|
| 7,490,331 | B2 * | 2/2009 | Beisiegel | G06F 8/30 707/999.1 |
| 2004/0028212 | A1 * | 2/2004 | Lok | G06F 17/30873 379/265.09 |
| 2004/0054969 | A1 * | 3/2004 | Chiang | H04L 67/02 715/234 |
| 2004/0088713 | A1 * | 5/2004 | Myllymaki | G06F 17/30864 719/315 |
| 2004/0117425 | A1 * | 6/2004 | Berkland | H04L 29/06 709/200 |
| 2004/0133580 | A1 * | 7/2004 | Liu | G06F 17/3089 |
| 2004/0193635 | A1 * | 9/2004 | Hsu | G06F 9/44505 |

(Continued)

OTHER PUBLICATIONS

"Oracle Application Server Containers for J2EE 10g (10.0.3.0.0) Developer Preview Enterprise Web Services" dated Sep. 3, 2003 retrieved on Apr. 1, 2005 from the Internet< URL: http://www.oracle.com/technology/tech/java/oc4j/1003/how_to/how-to-ws.html >.

(Continued)

*Primary Examiner* — Eliyah S Harper
(74) *Attorney, Agent, or Firm* — Hickman Palermo Becker Bingham LLP

(57) ABSTRACT

A database server that manages a database retrieves metadata that is stored, within the database, in association with a procedure that is stored in the database. Based on the metadata, a Web service definition is automatically constructed to describe the procedure as a Web service. The WSDL definition can be referenced to construct SOAP messages with the appropriate arguments and in the appropriate format which, when received, are converted to a suitable format for invoking execution of the procedure by the database server.

39 Claims, 4 Drawing Sheets

(56) References Cited

U.S. PATENT DOCUMENTS

| | | | |
|---|---|---|---|
| 2004/0210631 A1* | 10/2004 | Asher | G06F 17/30893 709/203 |
| 2004/0221017 A1* | 11/2004 | Yoon | H04L 29/06 709/217 |
| 2005/0149935 A1* | 7/2005 | Benedetti | G06F 9/547 718/102 |
| 2005/0160153 A1* | 7/2005 | Knutson | G06F 17/3089 709/217 |
| 2005/0209984 A1* | 9/2005 | Brown | G06F 9/465 |
| 2005/0278348 A1* | 12/2005 | Falter et al. | 707/100 |
| 2005/0278417 A1* | 12/2005 | Fremantle | H04L 67/306 709/203 |
| 2005/0283478 A1* | 12/2005 | Choi et al. | 707/9 |
| 2006/0195546 A1* | 8/2006 | Hulse | G06F 17/30864 709/217 |

OTHER PUBLICATIONS

"Creating Database Web Services for Invoking PL/SQL Stored Procedures" dated Sep. 3, 2003 retrieved on Apr. 1, 2005 from the Internet < URL: http://www.oracle.com/technology/tech/java/oc4j/1003/how_to/how-to-ws-db-plsql.html.

"How to: Create Database Web Services for Exposing DML Statements" dated Sep. 3, 2003 retrieved on Apr. 1, 2005 from the Internet < URL: http://www.oracle.com/technology/tech/java/oc4j/1003/how_to/how-to-ws-db-dml.html >.

"Creating Database Web Services for Invoking PL/SQL Stored Procedures" dated Sep. 3, 2003 retrieved on Apr. 1, 2005 from the Internet < URL: http://www.oracle.com/technology/tech/java/oc4j/1003/how_to/how-to-ws-db-query.html >.

* cited by examiner

TECHNIQUES FOR AUTOMATICALLY EXPOSING, AS WEB SERVICES, PROCEDURES AND FUNCTIONS STORED IN A DATABASE

FIELD OF THE INVENTION

The present invention relates to database systems and, more specifically, to techniques for automatically exposing, as web services, procedures and functions stored in a database.

BACKGROUND OF THE INVENTION

The term "Web services" (sometimes referred to as "application services") refers to a standardized way of integrating Web-based applications using the XML, SOAP, WSDL and UDDI open standards, over an Internet Protocol backbone using, for example, HTTP and HTTPS. Web services allow for communication of data among parties without intimate knowledge of each other's IT systems, which may be behind a firewall. Web services share business logic, data and processes through a programmatic interface across a network.

A Web service is, essentially, a function for which an input and output are specified. Thus, within a Web service definition, the input that the Web service requires is specified and the output that the Web service will return is specified. Specification of a Web service's input and output, in a corresponding Web service definition, includes data types and formats associated with invoking the Web service and returning results from the Web service.

Web services are commonly defined in an XML format that conforms to the WSDL (Web Service Description Language). Web service definitions can be stored and publicly listed using a registry service, such as in an XML-based registry that conforms to the Universal Description, Discovery and Integration (UDDI) specifications. Interactions between a Web service client and a Web service are commonly via exchanges of information in messages that conform to the Simple Object Access Protocol (SOAP).

Some database management systems have the capability to store procedures and functions in a database, and make such procedures and functions (referred to generally herein as "stored procedures") available for use by database clients. Typically, stored procedures contain logic for manipulating data that is managed by the database system. Clients typically make calls to stored procedures through an access API (application program interface), such as the JDBC API, which facilitates connecting to the backend database server and preparing and processing requests for execution of the stored procedures by the server against the database. However, use of access APIs to invoke stored procedures is a limited (e.g., less universally accessible) implementation mechanism because access APIs typically communicate with the backend server using a proprietary protocol and, therefore, the stored procedures within the database are not universally and readily available over public networks such as the Internet.

Based on the foregoing, there is a need for improved techniques for exposing and invoking procedures stored in a database.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1A:
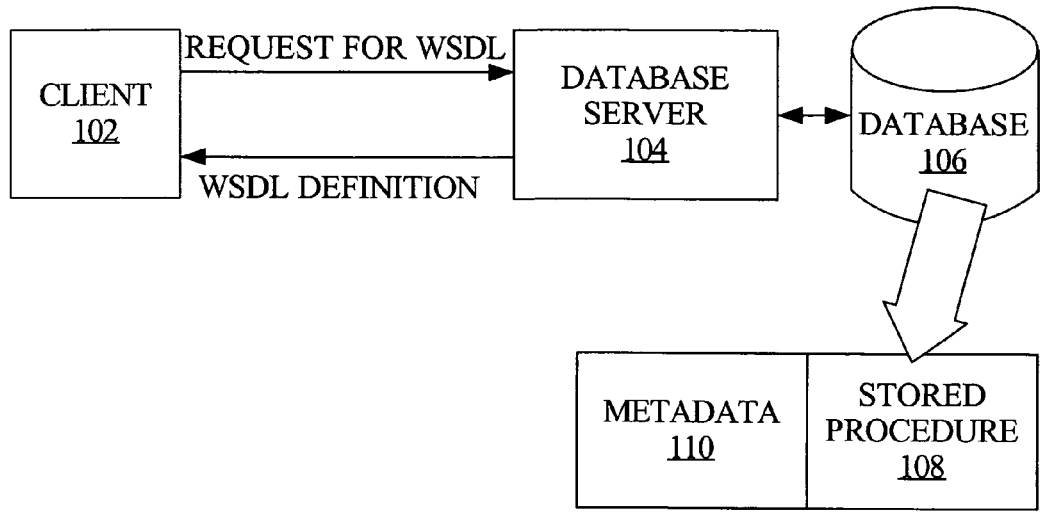
FIG. 1A is a block diagram that illustrates an operating environment in which an embodiment of invention may be implemented.

Techniques for handling procedures stored in a database are described. Specifically, techniques are described for automatically exposing, as a Web service, a stored procedure; and for invoking such a procedure. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview of Embodiments of the Invention

Web services, which take an input and typically generate an output, are commonly described in a Web service definition. The current de facto standard language used to describe Web services is the WSDL (Web Service Description Language). Within a Web service definition, the input that the Web service requires is specified and the output that the Web service will return is specified. Specification of a Web service's input and output, in a corresponding Web service definition, includes data types and formats associated with invoking the Web service and returning results from the Web service.

In one aspect, techniques are described for automatically exposing, as a Web service, a procedure stored in a database. A database server that manages a database retrieves metadata that is stored, within the database, in association with a procedure that is stored in the database. Based on the metadata, a Web service definition is automatically constructed to describe the procedure as a Web service.

For example, a particular procedure is identified from a resource locator, such as a URL, associated with the procedure. Once the procedure is identified, a database data dictionary is accessed to retrieve metadata about the input and output parameters (or arguments) declared for the procedure or function. The procedural parameters are converted, if necessary, to corresponding data types (e.g., from SQL data types to XML data types), to define the procedure as a Web service using WSDL. Once constructed, the WSDL definition of the Web service that represents the procedure can be, for example, returned to a requestor; stored as metadata within the database in association with the procedure; cached in a local memory; etc. Further, once constructed, the WSDL definition can be referenced to construct SOAP messages with the appropriate arguments and in the appropriate format to invoke execution of the procedure by the database server.

In one aspect, techniques are described for invoking, as a Web service, a procedure stored in a database. A server, such as a web server or database server, receives a message that conforms to the SOAP and that requests execution of a procedure stored in a database. For example, the content of the SOAP message may be based on a Web service WSDL definition that was automatically constructed to describe the procedure, according to another aspect of the invention. The message is converted from a Web service format represented in the message to a format required to invoke the procedure. For example, the arguments from the SOAP message are converted from XML data types and format to SQL data types and formats, so that the database server can invoke execution of the procedure against the database.

Operating Environment for Exposing a Stored Procedure as a Web Service

FIG. 1A is a block diagram that illustrates an operating environment in which an embodiment of invention may be implemented. FIG. 1A illustrates a client 102 communicating with a database server 104, that is connected to a database 106 in which one or more stored procedures 108, and associated metadata 110, are stored.

Client 102 represents any type of client application from which a request for a Web service definition may originate. For a non-limiting example, client 102 may be an application used by a procedure developer, who stores a procedure in database 106 and who requests construction of a Web service definition that corresponds to the stored procedure. Client 102 is implemented as one or more sequences of instructions which, when executed by a processor, perform certain actions described herein. Client 102 executes on a computer system, such as computer system 400 of FIG. 4.

A database server ("server") 104 is a combination of integrated software components and an allocation of computational resources (such as memory and processes) for executing the integrated software components on a processor, where the combination of the software and computational resources are used to manage a particular database, such as database 106. Among other functions of database management, a database server typically facilitates access to database 106 by processing requests from clients to access the database 106. Server 104 can be implemented on a conventional computer system, such as computer system 400 illustrated in FIG. 4.

Although FIG. 1A depicts a single database server 104 connected to a single database, embodiments of the invention are not limited to implementation in such a database system. For example, embodiments may be implemented in alternative database system configurations, such as (a) a clustered database system in which, generally, a plurality of communicatively coupled database servers collectively manage a single shared database, or (b) a distributed database system in which a plurality of communicatively coupled database servers manage respective databases.

Figure 2:
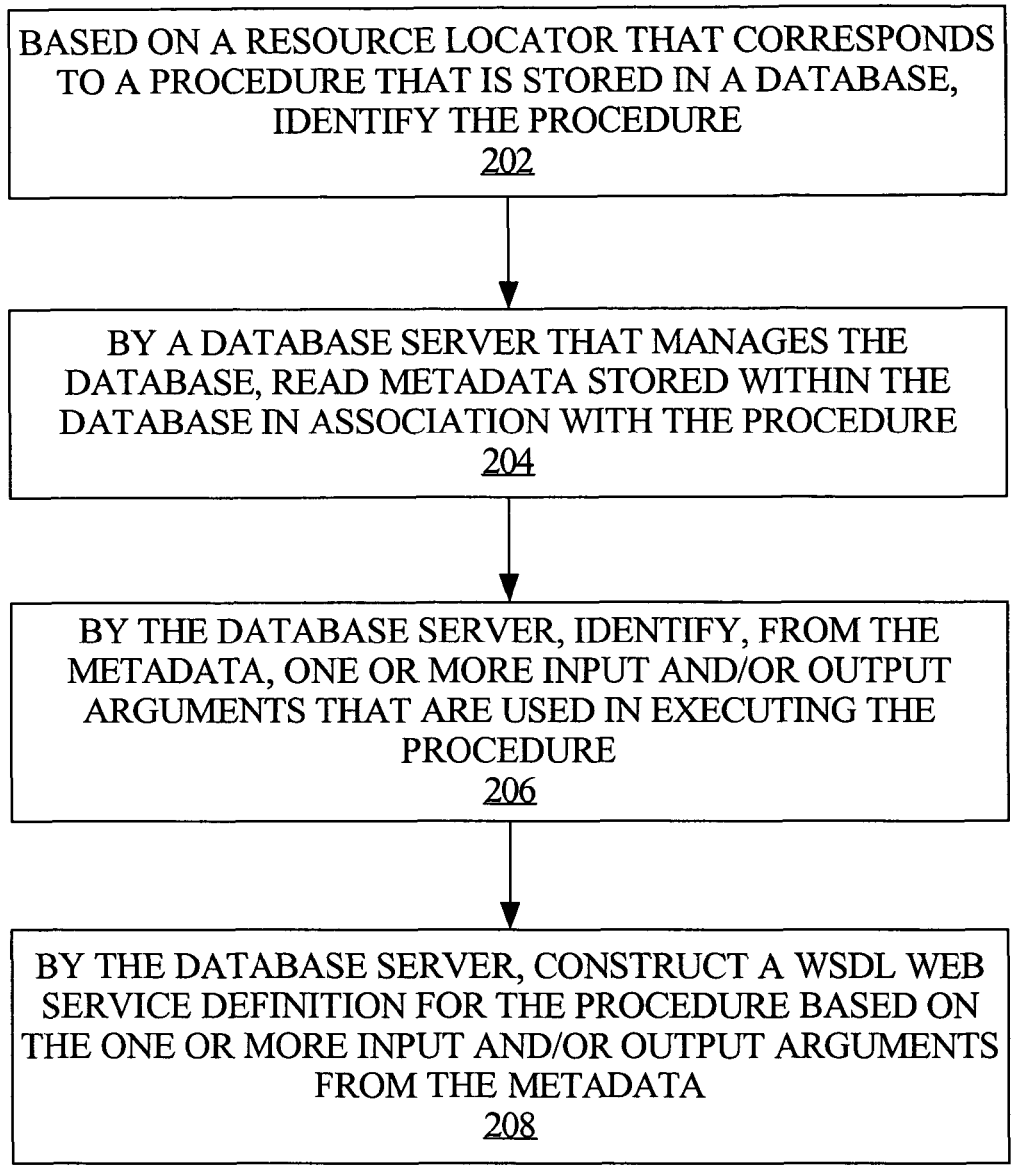
FIG. 2 is a flow diagram that illustrates a method for automatically constructing a Web service definition that corresponds to a procedure stored in a database, according to an embodiment of the invention.
Figure 3:
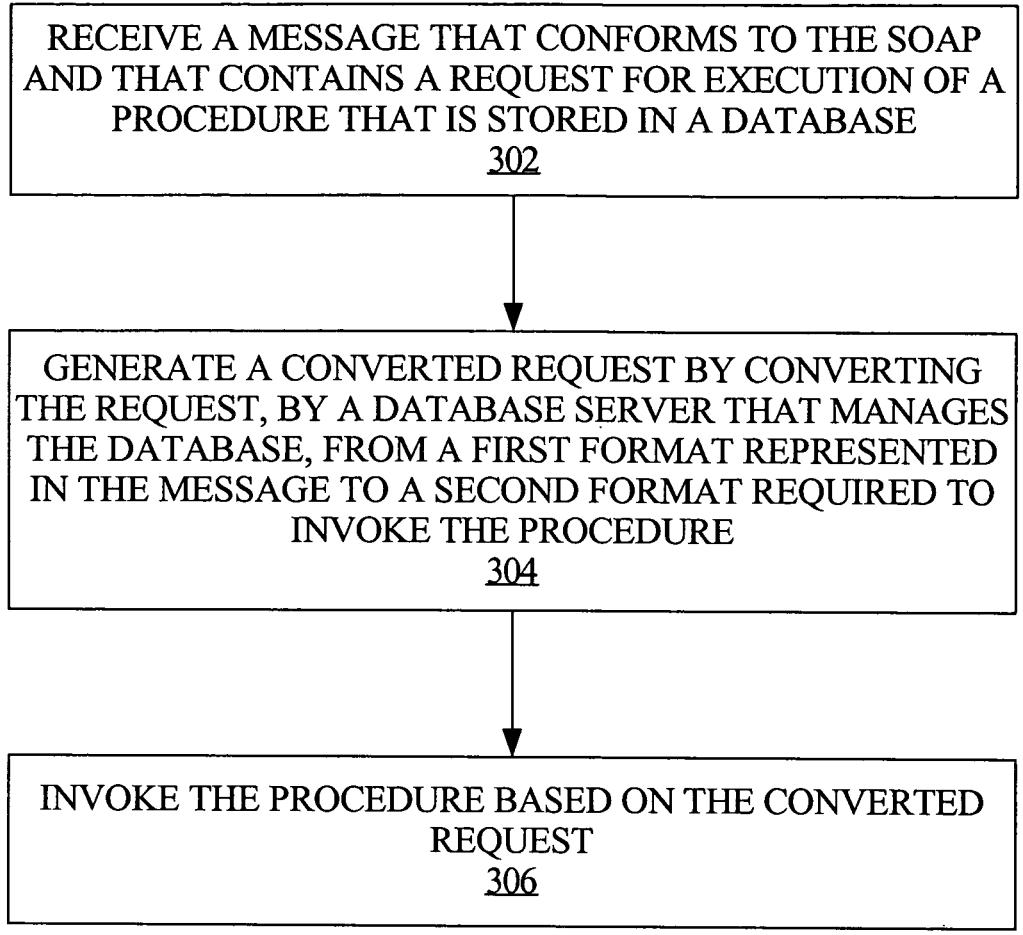
FIG. 3 is a flow diagram that illustrates a method for invoking a procedure stored in a database, according to an embodiment of the invention.

Server 104 can be implemented to perform the actions illustrated in, and described in reference to, FIG. 2 and FIG. 3. As is depicted in FIG. 1A, and described in detail in reference to FIG. 2, server 104 may be configured to receive a request for a WSDL definition of a Web service from client 102 and to return a WSDL definition to client 102 in response to such a request. A process that is utilized by server 104 to construct a WSDL definition that corresponds to a procedure stored in database 106 is described in reference to FIG. 2.

Database 106 contains data and metadata that is stored on a persistent memory mechanism, such as a set of hard disks, that is communicatively coupled to server 104. Such data and metadata may be stored in database 106 logically, for non-limiting examples, according to relational database constructs, multidimensional database constructs, object-oriented database constructs, object-relational database constructs, and the like. Specific to embodiments described herein, database 106 contains one or more stored procedures 108 and associated metadata 110 about the respective stored procedures 108.

The programming language in which any of the stored procedures 108 are written is not limited and, therefore, can vary from implementation to implementation. For example, stored procedures may be written in known languages such as PL/SQL™, Java™, C#, etc., or in languages that are not yet developed. Regardless of the language in which a stored procedure is written, the techniques described herein can be used to expose the procedure as a Web service. Furthermore, use of the term "procedure" is meant to be inclusive and, therefore, include all functions, routines, algorithms, and the like, which can take zero or more input values of any type and return zero or more output values of any type.

Metadata 110 includes metadata associated with respective stored procedures 108, and is stored in database 106. In one embodiment, metadata 110 is organized and stored in a database data dictionary. Metadata 110 includes information about any input arguments and/or output arguments that are declared in an associated stored procedure 108. For example, metadata 110 may include information, about a particular stored procedure, which specifies that the particular procedure takes an input value for argument a having a data type integer and an input value for argument d having a data type date, and outputs a return value having a data type varchar (i.e., a variable-length string). Use of the metadata 110 in constructing a Web service definition that corresponds to a stored procedure 108 is described in more detail in reference to FIG. 2.

Automatically Constructing a Web Service Definition Corresponding to a Stored Procedure FIG. 2 is a flow diagram that illustrates a method for automatically constructing a Web service definition that corresponds to a procedure stored in a database, according to an embodiment of the invention.

Skipping to block 204, a database server that manages a database in which procedures are stored, reads metadata that is stored within the database in association with a particular procedure for which a Web service definition will be constructed. For example, with reference to FIG. 1A, server 104 retrieves from database 106, metadata 110 about a stored procedure 108 for which a Web service definition will be constructed. In one embodiment, the metadata is retrieved from a data dictionary that is stored within the database. Block 204 may be performed, for non-limiting examples, (a) in response to an explicit request, from a client or client user, to construct a Web service definition that corresponds to the particular procedure, or (b) in conjunction with storing the particular procedure in the database, or (c) as part of a routine database maintenance operation.

In order to read the relevant metadata from the database, the particular metadata associated with the particular procedure needs to be identified. Thus, the particular procedure needs to be identified in order to know what metadata is needed to construct the Web service definition. In one embodiment, at block 202, the particular procedure, for which a Web service definition is to be constructed, is identified based on a resource locator that corresponds to the particular procedure as it is stored in the database.

For example, a request for construction of a Web service definition may be received at database server 104 (FIG. 1A) from client 102 (FIG. 1A), where the request contains a URL corresponding to where the particular procedure is stored in the database. For example, say a developer named "SCOTT" stored a procedure named "FOO" in the database. FOO takes 2 arguments: a is an IN argument of type number and b is an OUT ADT argument of type MYADT. The URL that corresponds to the stored procedure could be in the following form: "http://host:port/orawsdl/SCOTT/FOO". This URL is not static; it is configurable depending on the host and port on which the Web service (i.e., the exposed procedure) is hosted. The server 104 parses the URL to identify the name of the user and the name of the stored procedure. Knowing the name of the stored procedure, server 104 accesses the database dictionary to read metadata that is about, and stored in association with, the stored procedure.

At block 206, the database server identifies, from the metadata, one or more input and/or output arguments that are used in executing the procedure. For example, server 104 (FIG. 1A) accesses a database dictionary to look up the names and types of the arguments for the procedure FOO. Thus, from the dictionary the server identifies the arguments for FOO, e.g., the IN argument a of type number and the OUT argument b of type MYADT.

At block 208, the server automatically and dynamically (i.e., on-the-fly) constructs a Web service definition for the particular procedure based on the metadata, e.g., the input and output arguments. In one embodiment, the Web service definition constructed at block 208 is constructed to conform to WSDL. The definition for the Web service includes information about the input and output arguments and the name and URL of the Web service. In one embodiment, constructing the Web service definition includes determining an XML data type, to include in the Web service definition as a data type that corresponds to a particular procedural input or output argument, which maps to a corresponding SQL data type from the procedure. In one embodiment, each procedural input and output argument is described in the Web service definition with a tag having the same name as the corresponding procedural argument.

In scenarios in which the procedure takes any of multiple input arguments, in one embodiment the Web service definition is constructed to include respective input names and data types for each of the multiple input arguments, and an indication that either of the input arguments can be used in executing the procedure. For example, consider a procedure that takes either (a) argument a with a type number and argument b with a type number or (b) argument c with a type number and argument d with a type Boolean, as input arguments. Therefore, to account for both possible inputs to the procedure, the Web service definition for this procedure contains, in its description of the valid inputs, a choice between the two input sequences. For example, each of the arguments from each of the two optional input sequences can be associated with an XML attribute, minOccurs=0, to indicate that they are optional. In contrast, required arguments can be associated with an XML attribute, minOccurs=1. In an alternative embodiment, multiple Web services are constructed, one for each version of the procedure.

Some procedures use arguments that have an abstract data type (ADT). One way to describe an ADT argument in an XML-based format (e.g., WSDL) is to describe the ADT with an XML schema. In one embodiment, the process of constructing the Web service definition includes passing the ADT into a function that converts the ADT to an XML schema that describes the ADT. This XML schema is then included in the Web service definition that is constructed at block 208.

An approach which may be used for mapping relational metadata to XML is described in U.S. patent application Ser. No. 09/948,949 filed on Sep. 6, 2001, entitled "APPARATUS AND METHOD FOR MAPPING RELATIONAL DATA AND METADATA TO XML", which is incorporated by this reference in its entirety for all purposes as if fully disclosed herein. Furthermore, techniques for modeling XML data using an abstract data type in a relational database system are described in U.S. patent application Ser. No. 09/948,998 filed on Sep. 6, 2001, entitled "METHOD AND APPARATUS FOR FLEXIBLE STORAGE AND UNIFORM MANIPULATION OF XML DATA IN A RELATIONAL DATABASE SYSTEM", which is incorporated by this reference in its entirety for all purposes as if fully disclosed herein.

The method illustrated in FIG. 2 may be performed, in order to construct a Web service definition on-the-fly, in response to a request from a user that eventually wants to invoke the procedure. In addition, the method illustrated in FIG. 2 may be performed in response to a request from a procedure developer who can, as part of the process of developing a procedure, invoke the method to construct a Web service definition for the procedure. In the latter case, the Web service definition can then be stored as part of the persistent metadata about the procedure. In this scenario, if a Web service user subsequently requests the Web service definition that corresponds to the procedure, the definition can simply be read from the metadata and responsively sent to the user. This Web service definition is automatically invalidated and reconstructed if the procedure metadata is changed.

In one embodiment, based on the number of requests to construct and/or retrieve a particular Web service definition from persistent storage, the Web service definition is cached along with the procedure metadata. Such caching may be at a local session level or in the global metadata. Storing in the global metadata ensures that any session requesting the definition for the procedure will get the cached copy. If and when the procedure changes, then these cached Web service definitions are automatically invalidated.

Operating Environment for Invoking a Stored Procedure as a Web Service

Figure 1B:
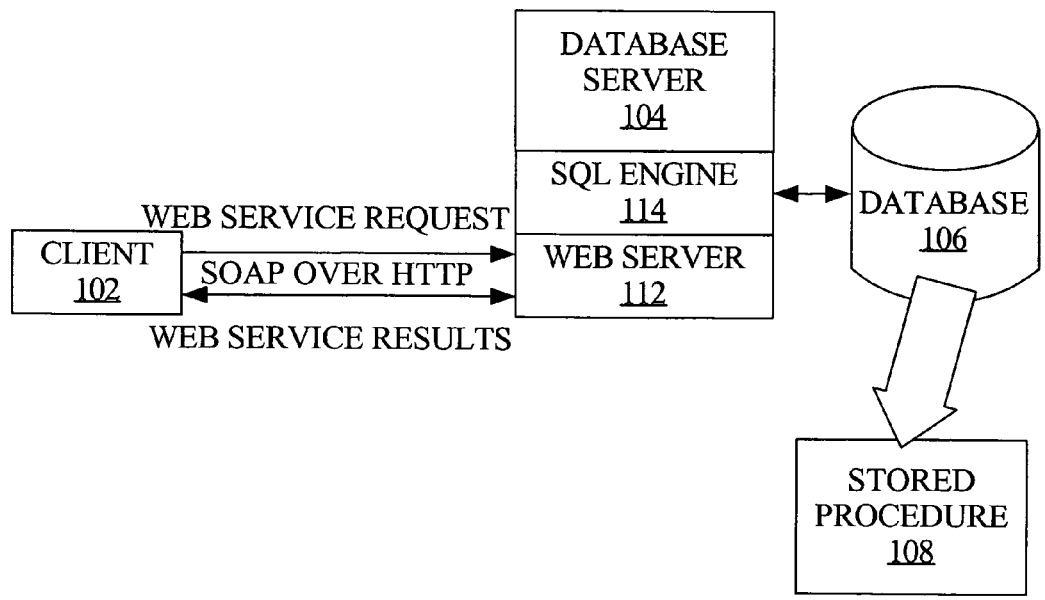
FIG. 1B is a block diagram that illustrates an operating environment in which an embodiment of invention may be implemented.

FIG. 1B is a block diagram that illustrates an operating environment in which an embodiment of invention may be implemented. FIG. 1B illustrates, similarly to FIG. 1A, a client 102 communicating with a database server 104, which is connected to a database 106 in which one or more procedures 108 are stored. Similarly depicted elements in FIGS. 1A and 1B are generally described in reference to FIG. 1A, unless otherwise indicated.

Client 102 represents any type of client application from which a request for a Web service may originate. Database server 104 facilitates access to database 106 by processing requests from clients to access the database 106. Generally, according to this aspect, client 102 sends a Web service request message to a web server 112, which returns Web service results. In one embodiment, the messages exchanged between client 102 and web server 112 conform to the SOAP.

Web server 112 is a server application that is capable of receiving communications from clients, over a network. Web server 112 is implemented as a module or component of database server 104. Web server 112 receives Web service request messages which get converted to a format that SQL engine 114 can execute against database 106. In one embodiment, conversion of SOAP-formatted messages to SQL-formatted statements is performed by database server 104. Such conversion may be performed by a web server 112 component of server 104, or by another module of server 104 upon reception of such messages from web server 112.

Server 104 includes a SQL engine 114 for processing SQL (or other query language) statements for execution of associated operations against the database 106. SQL engine 114 is a conventional SQL engine, which is typically integral to database server 104. SQL engine compiles SQL statements and executes such statements against database 106 to retrieve or manipulate data stored in database 106. SQL engine 114 receives converted information in SQL format, which was converted from an XML-based Web service request format, e.g., SOAP format.

Although FIG. 1B depicts a single database server 104 connected to a single database, embodiments of the invention are not limited to implementation in such a database system. For example, embodiments may be implemented in alternative database system configurations, such as (a) a clustered database system in which, generally, a plurality of communicatively coupled database servers collectively manage a single shared database, or (b) a distributed database system in which a plurality of communicatively coupled database servers manage respective databases.

Invoking a Web Service that Corresponds to a Stored Procedure in a Database

FIG. 3 is a flow diagram that illustrates a method for invoking a procedure stored in a database, according to an embodiment of the invention. In one embodiment, the method of FIG. 3 is performed by a database server, such as server 104 (FIG. 1B).

At block 302, a message is received that conforms to the SOAP, and that contains a request for execution of a procedure that is stored in a database. For example, web server 112 (FIG. 1B) receives a Web service request message containing an XML document in a SOAP envelope at a URL associated with the Web service, from client 102 (FIG. 1B) over a HTTP-based network. The message requests execution of a Web service that embodies or implements a procedure stored in database 106 (FIG. 1B) and contains the appropriate input for the procedure. The Web service request message may be formatted by a client in compliance with a WSDL Web service definition that is constructed according to the method described in reference to FIG. 2.

In order for the SQL engine 114 (FIG. 1B) of server 104 (FIG. 1B) to execute the procedure against database 106 (FIG. 1B), the request needs to be converted from the format represented in the message to a format required to invoke the desired procedure. Hence, at block 304, a converted request is generated by converting the request received at block 302 from a first format to a second format required to invoke the procedure. For example, the conversion process converts the information contained in the request message (e.g., XML-based input arguments/parameters and format) into a SQL statement that can be run against the database 106. Conversion may include conversion of XML data types associated with input and/or output arguments, to corresponding SQL data types, so that SQL engine 114 can execute a SQL-based procedure. In one embodiment, the database server that manages the database in which the procedure is stored performs the conversion. For example, server 104 receives a SOAP-enveloped XML document from web server 112, parses the document to extract the parameters, and generates a PL/SQL block for execution against database 106.

Then, at block 306, the procedure is invoked within the database based on the converted request. In summary, the method illustrated in FIG. 3 provides for conversion of a Web service-based request (e.g., a SOAP-enveloped XML document that is transmitted over a network using HTTP), such as by a database server, so that a stored procedure can be invoked within a database system in which the procedure is stored.

Example: WSDL Definition, Input Soap Document, and Output Soap Document

Below are examples of (1) a WSDL Web service definition, (2) a corresponding input SOAP document, and (3) a corresponding output SOAP document. The function in question is named "MYADTFUNC", which takes an instance of an object of type MYADT1 (A) as an IN argument. MYADT1 has an attribute called ATR, which is a number. The function also takes a number (B) as an OUT argument, which is assigned the value of the ATR attribute of A. The function returns the input MYADT1 (A) as the return value.

(1) The following is an example of WSDL Web service definition that may be automatically constructed, by a database server, to describe a corresponding procedure that is stored in a database that is managed by the database server.

```
- <definitions name="MYADTFUNC"
    targetNamespace="http://xmlns.oracle.com/orawsv/SCOTT/
    MYADTFUNC" xmlns="http://schemas.xmlsoap.org/wsdl/"
    xmlns:tns="http://xmlns.oracle.com/orawsv/SCOTT/MYADTFUNC"
    xmlns:xsd="http://www.w3.org/2001/XMLSchema"
    xmlns:soap="http://schemas.xmlsoap.org/wsdl/soap/">
  - <types>
    - <xsd:schema
        targetNamespace="http://xmlns.oracle.com/orawsv/SCOTT/
        MYADTFUNC" elementFormDefault="qualified">
      - <xsd:element name="MYADTFUNCInput">
        - <xsd:complexType>
          - <xsd:sequence>
            - <xsd:element name="B">
                <xsd:complexType />
              </xsd:element>
              <xsd:element name="A" type="tns:MYADT1Type"
              />
            </xsd:sequence>
          </xsd:complexType>
        </xsd:element>
      - <xsd:complexType name="MYADT1Type">
        - <xsd:sequence>
          - <xsd:element name="MYADT1">
            - <xsd:complexType>
              - <xsd:sequence>
                  <xsd:element name="ATR"
                    type="xsd:double" />
                </xsd:sequence>
              </xsd:complexType>
            </xsd:element>
          </xsd:sequence>
        </xsd:complexType>
      - <xsd:element name="MYADTFUNCOutput">
        - <xsd:complexType>
          - <xsd:sequence>
              <xsd:element name="RETURN"
                type="tns:MYADT1Type" />
              <xsd:element name="B" type="xsd:double" />
            </xsd:sequence>
          </xsd:complexType>
        </xsd:element>
      </xsd:schema>
    </types>
  - <message name="MYADTFUNCInputMessage">
      <part name="body" element="tns:MYADTFUNCInput" />
    </message>
```

-continued

```
- <message name="MYADTFUNCOutputMessage">
    <part name="body" element="tns:MYADTFUNCOutput" />
  </message>
- <portType name="MYADTFUNCPortType">
  - <operation name="MYADTFUNCOperation">
      <input message="tns:MYADTFUNCInputMessage" />
      <output message="tns:MYADTFUNCOutputMessage" />
    </operation>
  </portType>
- <binding name="MYADTFUNCBinding"
    type="tns:MYADTFUNCPortType">
    <soap:binding style="document"
      transport="http://schemas.xmlsoap.org/soap/http" />
  - <operation name="MYADTFUNCOperation">
      <soap:operation
        soapAction="http://stacp28:8252/orawsv/SCOTT/
        MYADTFUNC" />
    - <input>
        <soap:body use="literal" />
      </input>
    - <output>
        <soap:body use="literal" />
      </output>
    </operation>
  </binding>
- <service name="MYADTFUNCService">
    <documentation>Oracle Web Service</documentation>
  - <port name="MYADTFUNCPort"
      binding="tns:MYADTFUNCBinding">
      <soap:address
        location="http://stacp28:8252/orawsv/SCOTT/
        MYADTFUNC" />
    </port>
  </service>
</definitions>
```

(2) The following is an example of an input document that may be received at a Web service server, requesting execution of a Web service that corresponds to a procedure stored in a database, according to the foregoing WSDL Web service definition.

```
<?xml version="1.0" ?>
<soap:Envelope xmlns:soap=
 "http://www.w3.org/2002/06/soapenvelope">
 <soap:Body>
  <MYADTFUNCinput xmlns=
  "http://xmlns.oracle.com/orawsv/SCOTT/MYADTFUNC">
   <A>
    <MYADT1>
     <ATR>1000</ATR>
    </MYADT1>
   </A>
   <B/>
  </MYADTFUNCinput>
 </soap:Body>
</soap:Envelope>
```

(3) The following is an example of an output document that is returned by a Web service server in response to execution of a procedure, stored within a database, that is exposed as a Web service that is defined in the foregoing WSDL Web service definition.

```
<?xml version="1.0" ?>
<soap:Envelope xmlns:env="http://www.w3.org/2002/06/soap-envelope">
 <soap:Body>
  <MYADTFUNCOutput
  xmlns="http://xmlns.oracle.com/orawsv/SCOTT/MYADTFUNC">
   <RETURN>
    <MYADT1>
     <ATR>1000</ATR>
    </MYADT1>
```
```
   <RETURN>
    <B>1000</B>
   </MYADTFUNCOutput>
  </soap:Body>
</soap:Envelope>
```

Hardware Overview

Figure 4:
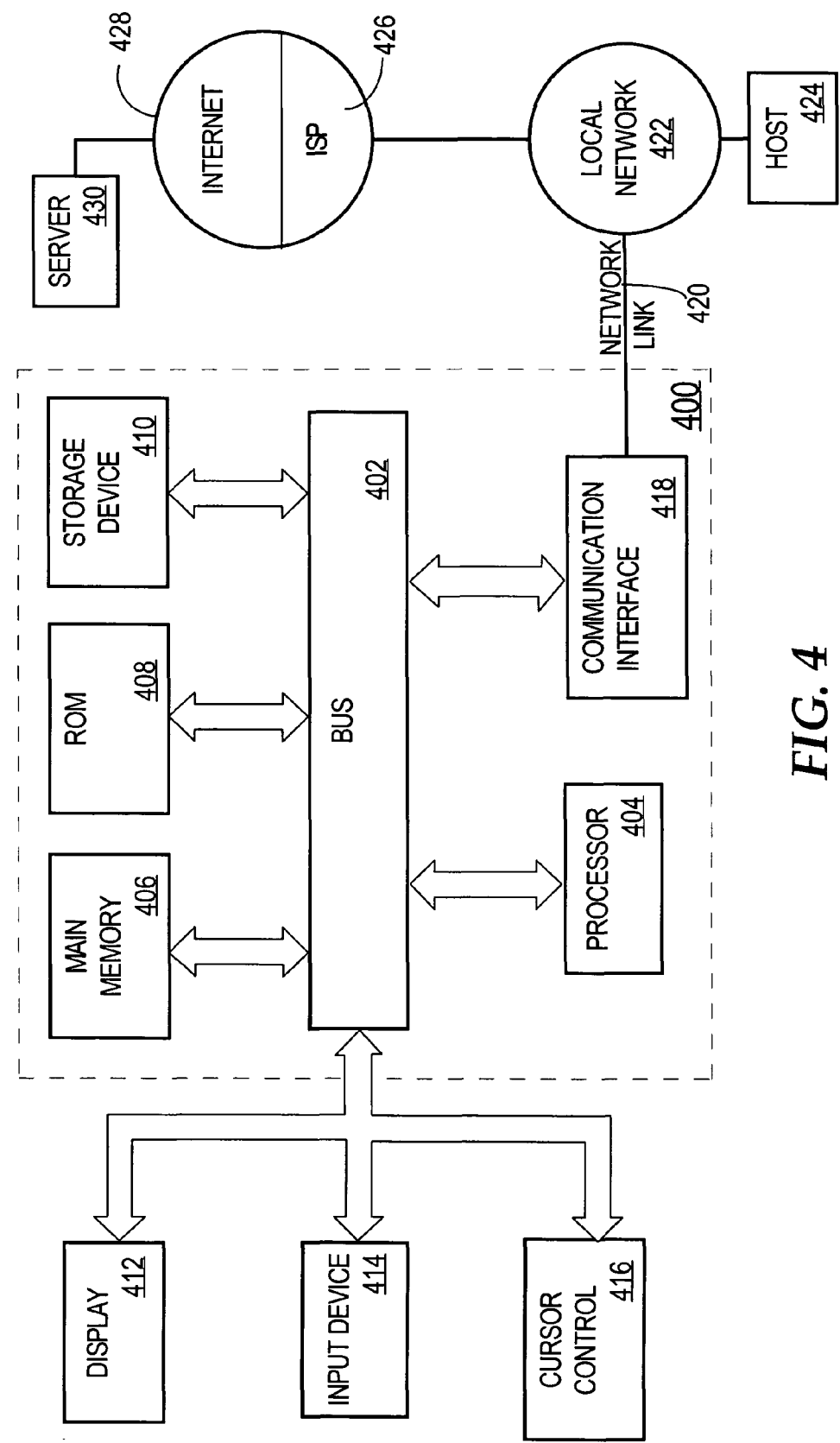
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Extensions and Alternatives

In the foregoing description, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A computer-implemented method comprising:
within a database server that manages a database, performing steps of:
receiving a HyperText Transfer Protocol (HTTP) based request that includes a Uniform Resource Locator (URL) that identifies a database procedure that is stored in the database in association with metadata stored in the database, the metadata specifying one or more input or output parameters for execution of the database procedure by the database server, wherein each of the one or more input or output parameters corresponds to one or more arguments accepted by the database procedure;
wherein the database procedure includes a plurality of statements, wherein the database procedure, if executed by the database server, causes the database server to perform, against the database, one or more operations for each of the plurality of statements;
in response to receiving the HTTP based request, the database server automatically performing steps of:
based on the database procedure, identifying the metadata stored, within the database, in association with the database procedure;
based on the metadata, constructing a new Web service definition that defines a new Web service for the database procedure and that conforms to Web Service Description Language (WSDL), wherein the new Web service definition includes:
one or more elements that map to the one or more input or output parameters, and
for each particular parameter of said one or more input or output parameters, a respective name of said each particular parameter and a respective data type of said each particular parameter; and
wherein the steps are performed by one or more computing devices.

2. The computer-implemented method of claim 1, wherein the metadata is stored in a data dictionary of the database.

3. The computer-implemented method of claim 1, wherein a data type of the one or more arguments is an abstract data type, and wherein the new Web service definition includes an XML schema that describes the abstract data type.

4. The computer-implemented method of claim 1, a data type of the one or more arguments is an abstract data type, and wherein the new Web service definition includes a reference to a location in memory at which an XML schema that describes the abstract data type is stored.

5. The computer-implemented method of claim 1, wherein the one or more arguments includes at least two disjunctive input arguments that are associated with the database procedure, and wherein the new Web service definition includes respective input names and data types for each of the at least two input arguments, and an indication that either of the at least two input arguments can be used in executing the database procedure.

6. The computer-implemented method of claim 1, wherein a first argument, from the one or more arguments, is an optional argument for the database procedure, and wherein the new Web service definition includes an element mapped to the first argument, wherein the element is associated with an attribute indicating that a minimum number of occurrences of the element is zero.

7. The computer-implemented method of claim 1, wherein a first argument, from the one or more arguments, is a required argument for the database procedure, and wherein the new Web service definition includes an element mapped to the first argument, wherein the element is associated with an attribute indicating that a minimum number of occurrences of the element is one.

8. The computer-implemented method of claim 1, wherein a first input argument, from the one or more arguments, is associated with a default value, and wherein the new Web service definition specifies the default value for the first input argument.

9. The computer-implemented method of claim 1, wherein the one or more arguments includes one or more first disjunctive input arguments and one or more second disjunctive input arguments that are associated with the database procedure, and wherein the new Web service definition includes a first Web service definition that includes respective input names and data types for each of the one or more first disjunctive input arguments, and a second Web service definition that includes respective input names and data types for each of the one or more second disjunctive input arguments.

10. The computer-implemented method of claim 1, wherein the step of constructing the new Web service definition includes determining an XML data type, to include in the new Web service definition as one of data types that corresponds to a particular input argument or corresponds to a particular output argument, and that corresponds to a SQL data type from the database procedure.

11. The computer-implemented method of claim 1, wherein the new Web service definition includes a name that corresponds to the database procedure and a second URL that corresponds to the database procedure, the method further comprising:
receiving, at a network address that corresponds to the second URL, information that includes the name that corresponds to the database procedure and a value for at least one of the one or more arguments, wherein the information conforms to Simple Object Access Protocol (SOAP); and
based on the information, executing the database procedure based at least on the value for the at least one of the one or more arguments.

12. The computer-implemented method of claim 11, wherein the step of executing the database procedure generates results, the method further comprising:
returning the results in a message that conforms to SOAP.

13. The computer-implemented method of claim 11, wherein the database procedure is available for execution by the database server in response to a call to the database procedure made by a first client through an access application programming interface, wherein the step of receiving the information includes receiving the information at the network address, from a second client, without the use of the access application programming interface.

14. The computer-implemented method of claim 11, wherein the step of executing the database procedure includes determining a SQL data type that corresponds to an XML data type included in the information, wherein an input argument accepted by the database procedure is of the SQL data type.

15. The computer-implemented method of claim 1, wherein the new Web service definition is stored in cache memory based on how many requests have been made for retrieval of the new Web service definition.

16. The computer-implemented method of claim 15, further comprising:
storing in the cache memory, in association with the new Web service definition, a copy of the metadata stored within the database in association with the database procedure.

17. The computer-implemented method of claim 16, further comprising:
in response to a change to the metadata stored within the database in association with the database procedure, automatically invalidating the new Web service definition stored in the cache memory.

18. The computer-implemented method of claim 1, wherein the new Web service definition is stored as part of the metadata stored within the database in association with the database procedure.

19. The computer-implemented method of claim 18, further comprising:
in response to a request for the new Web service definition, retrieving the new Web service definition from the metadata stored within the database in association with the database procedure; and
returning the new Web service definition retrieved from the metadata.

20. A non-transitory machine-readable storage medium storing one or more sequences of instructions include instructions which, when executed by one or more hardware processors, cause, within a database server that manages a database:
receiving a HyperText Transfer Protocol (HTTP) based request that includes a Uniform Resource Locator (URL) that identifies a database procedure that is stored in the database in association with metadata stored in the database, the metadata specifying one or more input or output parameters for execution of the database procedure by the database server, wherein each of the one or more input or output parameters corresponds to one or more arguments accepted by the database procedure;

wherein the database procedure includes a plurality of statements, wherein the database procedure, if executed by the database server, causes the database server to perform, against the database, one or more operations for each of the plurality of statements;

in response to receiving the HTTP based request, the database server automatically performing steps of:
based on the database procedure, identifying the metadata stored, within the database, in association with the database procedure; and
based on the metadata, constructing a new Web service definition that defines a new Web service for the database procedure and that conforms to Web Service Description Language (WSDL), wherein the new Web service definition includes:
one or more elements that map to the one or more input or output parameters, and
for each particular parameter of said one or more input or output parameters, a respective name of said each particular parameter and a respective data type of said each particular parameter.

21. The machine-readable storage medium of claim 20, wherein the metadata is stored in a data dictionary associated with the database.

22. The machine-readable storage medium of claim 20, wherein
a data type of the one or more arguments is an abstract data type, and
wherein the new Web service definition includes a reference to a location in memory at which an XML schema that describes the abstract data type is stored.

23. The machine-readable storage medium of claim 20, wherein the new Web service definition includes a name that corresponds to the database procedure and a second URL that corresponds to the database procedure, the instructions further include instructions, which when executed by said one or more hardware processors, cause:
receiving, at a network address that corresponds to the second URL, information that includes the name that corresponds to the database procedure and a value for at least one of the one or more arguments, wherein the information conforms to Simple Object Access Protocol (SOAP); and
based on the information, executing the database procedure based at least on the value for the at least one of the one or more arguments.

24. The machine-readable storage medium of claim 20, wherein the new Web service definition is stored in cache memory based on how many requests have been made for retrieval of the new Web service definition.

25. The machine-readable storage medium of claim 24, the instructions further include instructions, which when executed by said one or more hardware processors, cause:
storing in the cache memory, in association with the new Web service definition, a copy of the metadata stored within the database in association with the database procedure; and
in response to a change to the metadata stored within the database in association with the database procedure, automatically invalidating the new Web service definition stored in the cache memory.

26. The computer-implemented method of claim 1, wherein, before being exposed as said new Web service, the database procedure is available to a client for execution by the database server through an access application programming interface.

27. The machine-readable storage medium of claim 20, wherein, before being exposed as said new Web service, the database procedure is available to a client for execution by the database server through an access application programming interface.

28. The machine-readable storage medium of claim 20, wherein a data type of the one or more arguments is an abstract data type, and wherein the new Web service definition includes an XML schema that describes the abstract data type.

29. The machine-readable storage medium of claim 20, wherein the one or more arguments includes at least two disjunctive input arguments that are associated with the database procedure, and wherein the new Web service definition includes respective input names and data types for each of the at least two input arguments, and an indication that either of the at least two input arguments can be used in executing the database procedure.

30. The machine-readable storage medium of claim 20, wherein a first argument, from the one or more arguments, is an optional argument for the database procedure, and wherein the new Web service definition includes an element mapped to the first argument, wherein the element is associated with an attribute indicating that a minimum number of occurrences of the element is zero.

31. The machine-readable storage medium of claim 20, wherein a first argument, from the one or more arguments, is a required argument for the database procedure, and wherein the new Web service definition includes an element mapped to the first argument, wherein the element is associated with an attribute indicating that a minimum number of occurrences of the element is one.

32. The machine-readable storage medium of claim 20, wherein a first input argument, from the one or more arguments, is associated with a default value, and wherein the new Web service definition specifies the default value for the first input argument.

33. The machine-readable storage medium of claim 20, wherein the one or more arguments includes one or more first disjunctive input arguments and one or more second disjunctive input arguments that are associated with the database procedure, and wherein the new Web service definition includes a first Web service definition that includes respective input names and data types for each of the one or more first disjunctive input arguments, and a second Web service definition that includes respective input names and data types for each of the one or more second disjunctive input arguments.

34. The machine-readable storage medium of claim 20, wherein the step of constructing the new Web service definition includes determining an XML data type, to include in the new Web service definition as one of data types that corresponds to a particular input argument or corresponds to a particular output argument, and that corresponds to a SQL data type from the database procedure.

35. The machine-readable storage medium of claim 23, wherein the step of executing the database procedure generates results, the instructions further include instructions, which when executed by said one or more hardware processors, cause: returning the results in a message that conforms to SOAP.

36. The machine-readable storage medium of claim 23, wherein the database procedure is available for execution by the database server in response to a call to the database procedure made by a first client through an access application programming interface, wherein the step of receiving the information includes receiving the information at the network address, from a second client, without the use of the access application programming interface.

37. The machine-readable storage medium of claim 23, wherein the step of executing the database procedure includes determining a SQL data type that corresponds to an XML data type included in the information, wherein an input argument accepted by the database procedure is of the SQL data type.

38. The machine-readable storage medium of claim 20, wherein the new Web service definition is stored as part of the metadata stored within the database in association with the database procedure.

39. The machine-readable storage medium of claim 38, wherein the instructions further include instructions, which when executed by said one or more hardware processors, cause:
- in response to a request for the new Web service definition, retrieving the new Web service definition from the metadata stored within the database in association with the database procedure; and
- returning the new Web service definition retrieved from the metadata.

\* \* \* \* \*